Patented May 22, 1951

2,553,718

UNITED STATES PATENT OFFICE 2,553,718

GLYCIDYL ETHER COMPOSITIONS

Herbert A. Newey, Richmond, and Edward C. Shokal, Walnut Creek, Calif., assignors to Shell Development Company, San Francisco, Calif., a corporation of Delaware No Drawing. Application July 5, 1949,
Serial No. 103,172

12 Claims. (Cl. 260—47)

This invention relates to a composition of matter having properties which make it particularly suitable for use as a cold-setting adhesive.

It has long been recognized that many useful articles could be manufactured if there were a satisfactory means for uniting metal surfaces in a strong but inexpensive manner, i. e., other than by bolting, riveting, welding or soldering. Convential adhesive compositions such as glue, which operate by evaporation of the solvent therefrom, are unsuitable for such use because the metal is impervious and the solvent is unable to evaporate, particularly when the surfaces united are of considerable size. Moreover, the adhesive or active ingredient in most of such compositions does not set up or cure to an insoluble state. Consequently, subsequent contact of the united article with the solvent results in failure of the adhesive bond. Some adhesive compositions known heretofore have employed ingredients which convert to insoluble materials upon application of heat. A typical ingredient is resorcinol-modified phenol-formaldehyde resin. However, the necessity for application of heat in order to achieve a cure is a serious disadvantage entailing added expense. Moreover, the shear strength obtained is not very high even with these hot-setting adhesives, especially when metal surfaces are joined.

In order to be satisfactory for use in manufacture of articles from metal or other materials having impervious surfaces, the adhesive composition must meet a number of requirements. It must operate without evaporation of solvent therefrom. It must set up and cure without application of heat. Even if the latter requirement is achieved by adding a chemical curing agent to the adhesive ingredient so as to effect cure thereof, certain additional requirements are necessary. After addition of the curing agent, it is essential that the composition retain a workable fluid consistency to permit application and spreading for a reasonable time. In other words, the "pot life" of the composition must be from about 1 to 8 hours so as to enable workmen to apply the composition to the surfaces desired to be united. While this reasonable pot life is required, it is also necessary that the composition set up and cure sufficiently within another 16 to 20 hours so that surfaces joined therewith will have adequate strength within reasonable time to permit handling of the manufactured articles. It is further desirable that the curing continue so as to give maximum strength within a week's time. To be useful it is of course essential that the shear strength of the cured composition itself and the bonding strength to the surface which is joined be high, and that the adhesive bond be resistant to the action of solvents, especially water.

We have now discovered that the above objects are accomplished by employing benzyldimethylamine as curing agent with glycidyl ethers of polyhydric phenols. This amine appears to be unique for the purposes intended. After addition of it to a fluid mixture of the glycidyl ether, the viscosity of the composition (which is a measure of its fluidity) only increases slowly during the initial period and then the viscosity begins to increase very rapidly with gellation and setting up to reasonable hardness and strength occurring within an additional 16 hours' time. These unique properties enable the adhesive composition to be compounded and thereafter a reasonable time remains for application of the composition to the surfaces desired to be joined. Moreover, the composition after application sets up and hardens within a short time so as to give an adhesive bond of sufficient strength to enable handling of the manufactured article wherein it is used. Such closely related amines as trimethylamine, triethanolamine, benzylamine, benzyldiethylamine, aniline, methylaniline and diethylaniline fail in one or more aspects in comparison with benzyldimethylamine as curing agent.

The material contained in the composition of the invention which is subject to cure is a glycidyl ether of a dihydric phenol having a 1,2-epoxy equivalency of greater than one. By the epoxy equivalency reference is made to the average number of 1,2-epoxy groups

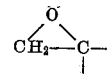

contained in the average molecule of the glycidyl ether. The glycidyl ethers of dihydric phenols owing to their method of preparation are ordinarily a mixture of chemical compounds which, although they are of similar identity and chemical constitution, have different molecular weights. The measured molecular weight of the mixture upon which the epoxy equivalency is dependent will necessarily be an average molecular weight. Consequently, the epoxy equivalency of the glycidyl ether mixture will not necessarily be the integer two, but will be a value which is greater than one. For example, a glycidyl ether suitable for use in the invention is made by reacting bis-(4-hydroxyphenyl)-2,2-propane with epichlorhydrin in alkaline solution in a mol ratio of about 1.4 mols of epichlorhydrin per mol of the dihydric phenol. The product is a solid mixture of glycidyl ethers having a measured average molecular weight of 791. Analysis shows the product to contain about 0.169 equivalent of epoxy per 100 grams. Consequently, the product has an epoxy equivalency of about 1.34, i. e., an average of about 1.34 epoxy groups per molecule.

The 1,2-epoxide value of the glycidyl ether is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups.. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

The glycidyl ethers of the dihydric phenols used in the composition of the invention are prepared by reacting a dihydric phenol with epichlorhydrin in alkaline solution. For this purpose any of the various dihydric phenols are used, including mononuclear phenols like resorcinol, catechol, hydroquinone, etc., or polynuclear phenols like bis-(4-hydroxyphenyl)-2,2-propane (bis-phenol), 4,4'-dihydroxybenzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiarybutylphenyl)-2,2-propane, bis-(2-hydroxynaphthyl)-methane, 1,5-dihydroxynaphthalene, etc.

The glycidyl ethers of the dihydric phenols are made by heating at 50° C. to 150° C. the dihydric phenol with epichlorhydrin, using one to two or more mols of epichlorhydrin per mol of the dihydric phenol. Also present is a base such as sodium, potassium, calcium or barium hydroxide in amount of 10% to 30% stoichiometric excess of the epichlorhydrin—i. e., 1.1 to 1.3 equivalents of base per mol of epichlorhydrin. The heating is continued for several hours to convert the reactant to a taffy-like consistency whereupon the reaction product is washed with water until free of base. Although the product is a complex mixture of glycidyl ethers, the principal product may be represented by the formula

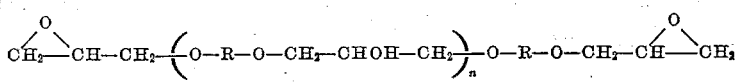

wherein R represents the divalent hydrocarbon radical of the dihydric phenol and n is 0, 1, 2, 3, etc. The length of the chain can be made to vary by changing the molecular proportion of epichlorhydrin and dihydric phenol. Thus by decreasing the mols of epichlorhydrin per mol of dihydric alcohol from about two downwards toward one, the molecular weight and the softening point of the resinous glycidyl ether is increased. In general, these glycidyl ethers, having an epoxy equivalency between one and two, contain terminal 1,2-epoxy groups, and have alternate aliphatic and aromatic nuclei linked together by ethereal oxygen atoms.

The nature of the glycidyl ethers from dihydric phenols can be better understood by considering preparation of products which we use in our invention. In the examples, the parts are by weight.

EXAMPLE I

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20 to 30° C. temperature was started 30 minutes later and continued for 4½ hours. The product was dried by heating to a final temperature of 140° C. in 80 minutes, and cooled rapidly. At room temperature, the product was an extremely viscous, semi-solid having a melting point of 27° C. by Durran's mercury method and an epoxide equivalent weight of 249. This product will be referred to hereinafter for convenience as epoxy resin I.

EXAMPLE II

An epoxy ether resin (known hereinafter as epoxy resin II) was prepared by reacting 2.04 mols of epichlorhydrin with 1 mol of bis-(4-hydroxyphenyl)-2,2-propane (known to those skilled in the art as bis-phenol) in the presence of 2.14 mols of sodium hydroxide (5% excess). The resin was obtained by preparing a solution with 2280 parts of water, 245 parts of sodium hydroxide and 640 parts of bis-phenol. This solution in a reaction vessel fitted with a stirrer was heated to about 45° C. whereupon 530 parts of epichlorhydrin were rapidly added while agitating the reaction mixture. In about 50 minutes, the temperature of the reaction mixture, without application of external heat, rose to about 95° C. from the exothermic heat of reaction. As the resin formed, the reaction mixture separated into a two phase system consisting of an aqueous phase and a molten taffy-like resin phase. About 80 minutes after the epichlorhydrin was added, the aqueous layer was removed and the molten resin was washed continuously with hot water until the wash water was neutral to litmus. Then the water was drained from the resin and the resin heated at about 140° C. with agitation until dry. The molten resin was cooled and flaked.

The resulting resin had a melting point of 43° C. by the Durran's mercury method and a molecular weight of 510 measured ebullioscopically in ethylene dichloride. The epoxy value of the resin was 0.326 equivalent per 100 grams so the resin had a 1,2-epoxy equivalency of 1.66 epoxy groups per molecule. The epoxide value was determined by heating a weighed sample of the resin with an excess of 0.2 N pyridinium chloride chloroform solution at the boiling point under reflux for 2 hours whereby the pyridinium chloride hydrochlorinates the epoxy groups to chlorhydrin groups. After cooling, the excess pyridinium chloride is back titrated with 0.1 N sodium hydroxide in methanol to the phenolphthalein end point. This method was used for obtaining all epoxide values discussed herein.

EXAMPLE III

A third epoxy resin was prepared by reacting 1.22 mols of epichlorhydrin with 1 mol of bis-phenol in the presence of 1.37 mols of sodium hydroxide (12.5% excess) as a 9% aqueous solution, the reaction being effected as described in Example I.

The resin had a melting point of 100° C. by the Durran's mercury method and the molecular weight was 1415 by ebullioscopic measurements in ethylene dichloride. The 1,2-epoxy value was 0.116 equivalent per 100 grams. This resin will be known as epoxy resin III.

EXAMPLE IV

An epoxy resin of still higher molecular weight and softening point was prepared by reacting the resin obtained as described in Example III with an added 5% of bis-phenol. A portion of the Example III resin was melted and heated to 150° C. whereupon the added 5% of bis-phenol was mixed therewith. The reaction mixture was then heated so as to gradually increase the temperature thereof to 190° C. in 25 minutes, which temperature was maintained for an additional 1½ hours to complete the reaction. The resin was then cooled and flaked.

The resulting resin had a Durran's mercury method melting point of 131° C. and a molecular weight of 2560 (ebullioscopic in ethylene dichloride). The 1,2-epoxy equivalency was 0.059 equivalent per 100 grams. This resin is designated epoxy resin IV.

In general, the glycidyl ethers of the dihydric phenols are solid or substantially solid at room temperature. In order for the adhesive composition to have a workable fluid consistency, it is necessary that some other ingredient be added so that the viscosity at 20° C. will be from 500 to 100,000 centipoises, preferably from 1000 to 50,000 centipoises. To obtain such fluidity there may be added non-volatile solvents such as dibutyl phthalate or tricresyl phosphate. However, the incorporation of such substances into the composition tends to decrease the shear strength of the cured material. Consequently, it is preferred to employ as viscosity reducer, a liquid reactive solvent, i. e., a liquid compound containing a 1,2-epoxy group or groups such as styrene oxide, butadiene monoxide, phenyl glycidyl ether, allyl glycidyl ether or glycidyl ethers of polyhydric alcohols such as ethylene glycol, diethylene glycol, propylene glycol or glycerol. The polyglycidyl ether from the latter alcohol is particularly preferred as a diluent. Polyglycidyl ethers of other polyhdric alcohols are also suitable. These are prepared by reacting the polyhydric alcohol with epichlorhydrin in the presence of 0.1% to about 2% of an acid acting compound as catalyst such as boron trifluoride, hydrofluoric acid or stannic chloride, whereby the glycidyl ether is formed as product. The reaction is effected at about 50° C. to 125° C. with the proportions of reactants being such that there is about one mol of epichlorhydrin for each molecular equivalent of hydroxyl group in the polyhydric alcohol. Thus in preparing the ether of diethylene glycol, which glycol contains two hydroxyl groups in each molecule thereof, about two mols of epichlorhydrin for each mol of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of the polyhydric alcohols may be illustrated by considering application of the foregoing method in preparing the glycidyl ether of glycerol.

EXAMPLE V

In parts by weight, about 276 parts of glycerol (3 mols) are mixed with 828 parts of epichlorhydrin (9 mols). To this reaction mixture is added 10 parts of a diethyl ether solution containing about 4.5% of boron trifluoride. The temperature rises as a result of the exothermic reaction and external cooling with ice water is applied so as to keep the temperature between about 50° C. and 75° C. during a reaction period of about 3 hours. About 370 parts of the resulting glycerol-epichlorhydrin condensate are dissolved in 900 parts of dioxane containing about 300 parts of sodium aluminate. While agitating, the reaction mixture is heated and refluxed at 93° C. for about 9 hours. After cooling to atmospheric temperature, the insoluble material is filtered from the reaction mixture and low boiling substances removed by distillation to a temperature of 205° C. at 20 mm. pressure. The epoxy ether, in amount of 261 parts, is a pale yellow, viscous liquid. In has an epoxide value of 0.671 equivalent per 100 grams and the molecular weight is 324 as measured ebullioscopically in a dioxane solution. These values show that the glycidyl ether has an epoxy equivalency of 2.18—i. e., an average of 2.18 epoxide groups per molecule. This product will be known as epoxy resin V. In general, the polyglycidyl ethers of glycerol have an epoxy equivalency of 2 to 2.5.

The glycidyl ether of a dihydric phenol cures to an insoluble product upon addition thereto of the benzyldimethylamine, the cure being deemed sufficiently complete when the product becomes insoluble in toluene. In effecting the cure, there is added about 7% to 25% of benzyldimethylamine to the glycidyl ether of dihydric phenol compositions, which compositions may consist solely of said glycidyl ether or may comprise a major portion of said glycidyl ether in admixture with a diluent therefor, particularly a normally liquid mono-epoxy compound and/or a polyglycidyl ether of a polyhydric alcohol. Preferably, about an added 10% to 20%, especially about 15%, of benzyldimethylamine is employed for best results.

The exceptional character of benzyldimethylamine is particularly useful when this amine is employed as curing agent with spreadably fluid compositions containing a glycidyl ether of a dihydric phenol as principal resin-forming substance. Even though benzyldimethylamine is a tertiary amine which contains no reactive labile hydrogen atom attached to the nitrogen atom thereof and is a very weak base, it cures to epoxy-containing compositions completely without heating in reasonable time. Moreover, spreadably fluid compositions containing the glycidyl ether of a dihydric phenol will remain sufficiently fluid after addition of benzyldimethylamine so that the mixture containing the amine can be applied for its intended purpose such as an adhesive. Nevertheless, after application of the epoxy composition containing the amine as an adhesive for binding articles together, the composition cures at atmospheric temperature in a reasonable time of 16 to 20 hours so that sufficient strength in the resin bond of the glued articles is attained to permit ordinary handling thereof. In about 4 to 7 days, the adhesive bond reaches maximum strength which is very high.

In comparison with other amines which are closely related in chemical structure to benzyldimethylamine, it behaves in most unexpected manner. This fact will be apparent from the results given in Table I below. The compositions consisted of equal parts by weight of epoxy resin II and epoxy resin V to which was added the noted percentages of the named amines. The pot life of the mixture was the time which elapsed after addition of the amine for the mixture to gel or to become so viscous that it was no longer sufficiently fluid to be spreadable. Blanks in the pot life column indicate the mixture neither gelled nor became unspreadable in 6 days' time. The hardness of the curing mixture was observed after 1 and 6 days' time. Numerical values for hardness were obtained with a modified Barcol hardness tester which gave a modified value of 90 for a Barcol hardness of 10. When the resin was so soft as to be unmeasureable with the modified hardness tester but could be indented by hand with a glass rod, it was termed "soft." The adhesive qualities of the mixture were determined with the aid of one-quarter inch thick blocks made of linen sheets laminated together with phenolic resin. The epoxy composition after addition of the curing agent was spread on a one inch square surface of each of two carefully cleaned blocks with use of a doctor blade having a clearance of 0.005 inch. The adhesive coated surfaces of the two blocks were then united and the joined blocks were allowed to stand for 6 days after which the blocks were subjected to the block shear strength test of the Army-Navy-Civil Committee on Aircraft Design Criteria: "Wood Aircraft Inspection and Fabrication." ANC-19 (Dec. 20, 1943) discussed in an article by R. C. Rinker and G. M. Kline, Modern plastics, vol. 23, p, 164, 1945. All of the foregoing operations and tests were performed at normal atmospheric temperature of about 70° F. Besides the various amines listed in the table, it was also desired to make comparative tests with trimethylamine. However, this was impossible since that compound has a boiling point of 3.5° C. and is a gas at ordinary atmospheric temperature so that it boils from the epoxy composition.

affect the strength of the bond. Benzyldimethylamine fulfills this requirement.

About an added 15% of benzyldimethylamine was mixed with a composition consisting of 90% epoxy resin I and 10% allyl glycidyl ether. The mixture was a spreadably fluid consistency when first prepared and gelled in 72 hours. The freshly prepared mixture was applied as described above to phenolic linen blocks. The joined blocks were kept in a constant temperature room at 77° F. for 144 hours (6 days) and were then immersed in boiling water for an additional hour's time to test the water resistance of the glue bond. It was found that the cured benzyldimethylamine composition gave blocks after the boiling water immersion having a shear strength of 3,150 pounds per square inch.

When using benzyldimethylamine for the purpose of effecting cure of epoxy compositions employed for adhesive purposes, it is usually desirable to effect the cure without heating at ordinary atmospheric temperatures of from about 15° C. to 40° C. The use of such temperatures is possible because of the unique properties of benzyldimethylamine with respect to pot life, etc. pointed out above. While cures at normal temperature are effective with the amine, it is nevertheless desirable in some cases to employ elevated temperatures such as up to 160° C. although more generally temperatures of up to about 100° C. are used. By employing elevated temperatures, the rate of cure is increased which at times is desirable. In those cases wherein the glycidyl ether of a dihydric phenol is used in admixture with a comparatively lower boiling reactive solvent, the temperature of cure is at least 20° C. below the boiling point of the lowest boiling constituent in the curing mixture in order that it will not boil therefrom during the curing operation.

As an example of use of elevated curing temperatures, a mixture was prepared consisting of 75% epoxy resin I and 25% epoxy resin V to which was added 15% of benzyldimethylamine. This fluid mixture had a gel time of 125 minutes at ordinary temperature of about 20° C. The freshly prepared mixture was applied as an adhesive to phenolic linen blocks in the manner described hereinbefore. One set of blocks was subjected to heat treatment at 60° C. for 48 hours

*Table I*

| Curing Agent | Added Per Cent | Pot Life, hrs. | Hardness after— | | Shear Strength, lbs./sq. in. |
| --- | --- | --- | --- | --- | --- |
| | | | 1 day | 6 days | |
| Benzyldimethylamine | 5 | | Not set | Soft | None. |
| | 10 | 1.5 | 0 | 70 | 1,340. |
| | 15 | 1.25 | 0 | 72 | 3,690. |
| Benzyldiethylamine | 5 | | Not set | Not set | None. |
| | 10 | | do | do | Do. |
| | 15 | >48 | do | Soft | Do. |
| Benzylamine | 5 | >48 | Not set | do | |
| | 10 | 2.5 | Soft | do | None. |
| | 15 | 2.25 | do | do | Do. |
| Methylaniline | 5 | | Not set | Not set | |
| | 10 | | do | do | None. |
| | 15 | | do | do | Do. |
| Diethylaniline | 5 | | do | do | None. |
| | 10 | | do | do | Do. |
| | 15 | | do | do | Do. |
| Triethanolamine | 5 | | do | do | |
| | 10 | >48 | do | Soft | None. |
| | 15 | >48 | do | do | 540. |

In order to be of maximum usefulness when used for adhesive purposes, it is essential that the curing agent effect conversion of the glycidyl ether composition to a state wherein contact with water, especially boiling water, will not adversely while another set was treated for 48 hours at 80° C. After cooling, determination of shear strength upon the blocks gave a value of 4600 pounds per square inch for the 60° C. cured blocks and 5210 for the 80° C. blocks.

The use of elevated temperatures enables the glycidyl ether composition containing benzyldimethylamine to be employed as a baking varnish or enamel. For this purpose, it is desirable to utilize the glycidyl ether of a dihydric phenol as a solution in a suitable solvent such as lower ketones like acetone, methyl ethyl ketone, methyl isobutyl ketone, cyclohexanone, isophorone, etc.; esters like ethyl acetate, isopropyl acetate, butyl acetate, isoamyl acetate, etc.; and monoalkyl ethers of ethylene glycol like methyl, ethyl or butyl ethers as well as esters thereof such as the acetate or propionate. Preferably such solvents have a boiling point below 175° C. If desired, other materials like lower aromatic hydrocarbons such as benzene, toluene and/or xylene may be used in combination with the oxygen-containing compounds in order to cheapen the cost of the solvent.

The compositions of the invention are applied as protection to surfaces by brushing, spraying and the like. The amount of solvent contained in the solution may be varied to suit the particular need. Ordinarily, the solution will contain about 5% to 60% of the composition of the invention. Pigments, as desired, may be incorporated therewith. The solution is applied to the surface to be coated, and either the solvent is first allowed to evaporate after which heat is applied by circulating hot air or by use of infra-red lamps, or the heating is effected with simultaneous removal of solvent and curing.

The use of benzyldimethylamine is particularly advantageous in surface coating applications. Amines generally tend to give discoloration in heat-cured compositions, but benzyldimethylamine is exceptionally free of this disadvantage for some unexplainable reason. The advantageous property of benzyldimethylamine is evident from the following results.

Compositions were prepared by separately dissolving epoxy resins II, III and IV in equal parts by weight of methyl cellosolve acetate (monomethyl ether of ethylene glycol acetate) and xylene. Based upon the weight of the resin-forming glycidyl ether, there was then added benzyldimethylamine or for purposes of comparison, diethylene triamine (a conventional amine curing agent), in amount stated in the following table.

Table II

| Epoxy Resin | Benzyldimethylamine | Diethylene Triamine |
| --- | --- | --- |
| II | 10 | 12 |
| III | 7 | 4 |
| IV | 7 | 3 |

The solutions containing the curing agent were sprayed onto glass panels which were air dried for a short period and then baked for 30 minutes using a temperature of 100° C. with the benzyldimethylamine and 150° C. for the diethylene triamine. The resulting films were about 4 mils thickness. One set of panels was then subjected to exposure for 25 cycles in an Atlas Twin-Arc Weatherometer using a 20-hour cycle with 18 minutes of water spray every two hours. Another set was subjected to exposure in an oven for 16 hours wherein hot air at 200° C. circulated. Visual examination upon completion of the tests showed that in every instance, the films cured with diethylene triamine were discolored with those subjected to the oven aging at the high temperature giving the most marked difference in favor of the films cured with benzyldimethylamine.

It is thus evident that the use of benzyldimethylamine as curing agent for 1,2-epoxy compounds, particularly glycidyl ethers of dihydric phenols, gives unexpectedly outstanding results. Moreover, these results are attained with either hot-cure or cold-cure procedures. The amine is especially useful as curing agent in the cold-setting adhesive compositions which give high strength bonds, and accordingly, a long felt need is fulfilled.

Utilization of the amine to achieve the objects of the invention is readily accomplished. The desired proportion of benzyldimethylamine is added to the fluid mixture comprising the glycidyl ether of the polyhydric phenol. While still fluid, the composition is applied, such as by spreading, to at least one but preferably two of the surfaces to be united. The thickness of the film of applied adhesive is kept at a minimum for sake of economy; film thickness being from 0.0005 to 0.1 inch. The surfaces are then united while the applied adhesive remains fluid and the contact is maintained by suitable means such as clamps or weights, if necessary, until the composition has solidified and hardened. The contact is continued by use of the clamps or the like until the hardening is sufficient to permit such roughness of handling as may be required with the particular article being manufactured. The joining article is then set aside for a reasonable time, like a week, which permits the composition to complete the hardening. All of these operations are conducted without heating at normal atmospheric temperature such as 15° C. to 40° C.

While the compositions fill a particular need in enabling joinder of metal surfaces in the manufacture of sundry articles, they are also suitable for uniting other surfaces so as to give a bond of great strength. Thus, the compositions may be used in manufacturing shoes from leather, rubber and/or plastic sheeting; for joining glass; for joining resins; etc. The compositions are also very suitable for manufacture of furniture and other articles from wood, or combinations of wood, metal, plastic and the like. The adhesive solution can be mixed with clay, wood flour, cotton linter and fibers, mineral fillers, pigments, etc., to produce calking compounds, fillers, putty-like compositions, and moldable products.

We claim as our invention:

1. A composition of matter comprising an added 7% to 25% of benzyldimethylamine commingled with glycidyl ether of a dihydric phenol, which ether is free from functional groups other than epoxy and hydroxyl groups and has a 1,2-epoxy equivalency between one and two.

2. A process for producing a toluene-insoluble product which comprises commingling an added 7% to 25% of benzyldimethylamine to glycidyl ether of a dihydric phenol, which ether is free from functional groups other than epoxy and hydroxyl groups and has a 1,2-epoxy equivalency between one and two, and permitting the resulting mixture to cure until it becomes insoluble in toluene.

3. The cured product obtained by the process of claim 2.

4. A composition of matter comprising an added 10% to 20% of benzyldimethylamine commingled with glycidyl ether of a dihydric phenol which ether is free from functional groups other than epoxy and hydroxyl groups and has a 1,2-epoxy equivalency between one and two.

5. A process for producing a toluene-insoluble product which comprises commingling an added 10% to 20% of benzyldimethylamine to glycidyl ether of a dihydric phenol which ether is free from functional groups other than epoxy and hydroxyl groups and has a 1,2-epoxy equivalency between one and two, and curing the resulting mixture at 15° C. to 160° C. until it becomes insoluble in toluene.

6. A composition of matter comprising an added 7% to 25% of benzyldimethylamine commingled with glycidyl ether of bis-(4-hydroxyphenyl)-2,2-propane having a 1,2-epoxy equivalency between one and two.

7. A process for producing a toluene-insoluble product which comprises commingling an added 10% to 20% of benzyldimethylamine to glycidyl ether of bis-(4-hydroxyphenyl)-2,2-propane having a 1,2-epoxy equivalency between one and two, and curing the resulting mixture at 15° C. to 160° C. until it becomes insoluble in toluene.

8. A composition of matter comprising a spreadably fluid mixture of glycidyl ether of a dihydric phenol which ether is free from functional groups other than epoxy and hydroxyl groups and has a 1,2-epoxy equivalency between one and two and a liquid polyglycidyl ether of a polyhydric alcohol in admixture with an added 10% to 20% of benzyldimethylamine.

9. A composition of matter comprising a spreadably fluid mixture of glycidyl ether of a dihydric phenol which ether is free from functional groups other than epoxy and hydroxyl groups and has a 1,2-epoxy equivalency between one and two and a liquid mono-epoxy compound commingled with an added 10% to 20% of benzyldimethylamine.

10. A composition of matter comprising a spreadably fluid mixture of (1) glycidyl ether of bis-(4-hydroxyphenyl-2,2-propane having a 1,2-epoxy equivalency between one and two, (2) a polyglycidyl ether of glycerol, and (3) a liquid mono-epoxy compound, which mixture is commingled with an added 10% to 20% of benzyldimethylamine.

11. A process of producing a toluene-insoluble product which comprises commingling an added 10% to 20% of benzyldimethylamine with a spreadably fluid mixture of (1) glycidyl ether of bis-(4-hydroxyphenyl)-2,2-propane having a 1,2-epoxy equivalency between one and two, (2) a polyglycidyl ether of glycerol, and (3) a liquid mono-epoxy compound, and curing the resulting mixture at 15° C. to 40° C. until it becomes insoluble in toluene.

12. The cured toluene-insoluble product obtained by the process of claim 11.

HERBERT A. NEWEY.
EDWARD C. SHOKAL.

REFERENCES CITED

The following references are of record in the file of this patent:

UNITED STATES PATENTS

| Number | Name | Date |
| --- | --- | --- |
| 2,444,333 | Castan | June 29, 1948 |